US012592038B2

(12) United States Patent
Zhao et al.

(10) Patent No.: US 12,592,038 B2
(45) Date of Patent: Mar. 31, 2026

(54) EDITABLE SEMANTIC MAP WITH VIRTUAL CAMERA FOR MOBILE ROBOT LEARNING

(71) Applicant: Robert Bosch GmbH, Stuttgart (DE)

(72) Inventors: Cheng Zhao, Cupertino, CA (US); Yuliang Guo, Redwood City, CA (US); Ruoyu Wang, Sunnyvale, CA (US); Xinyu Huang, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 18/674,023

(22) Filed: May 24, 2024

(65) Prior Publication Data

US 2025/0363737 A1     Nov. 27, 2025

(51) Int. Cl.
*G06T 17/05* (2011.01)
*G06T 7/194* (2017.01)
(Continued)

(52) U.S. Cl.
CPC .............. *G06T 17/05* (2013.01); *G06T 7/194* (2017.01); *G06T 11/60* (2013.01); *G06V 10/56* (2022.01);
(Continued)

(58) Field of Classification Search
CPC ......... G06T 17/05; G06T 17/20; G06T 7/194; G06T 7/20; G06T 7/70; G06T 5/50; G06T 5/60; G06T 5/77; G06T 11/60; G06T 15/04; G06T 2207/20021; G06T 2207/20081; G06T 2207/20084; G06T 2207/20016;
(Continued)

(56) References Cited

U.S. PATENT DOCUMENTS 10,891,795 B2 *  1/2021  Ha ............................ G06T 7/74
2020/0082219 A1 *  3/2020  Li ........................ G06F 18/2148
(Continued)

OTHER PUBLICATIONS

Kahneman, Daniel. Thinking, Fast and Slow. Macmillan, 2011, https://us.macmillan.com/books/9780374533557/ thinkingfastandslow.

(Continued)

*Primary Examiner* — Wesner Sajous
(74) *Attorney, Agent, or Firm* — Kathy Takeguchi; Maginot, Moore & Beck LLP

(57) ABSTRACT

A computer-implemented method and system relate to computer vision. A first semantic map of an environment is three-dimensional (3D). A foreground scene and a background scene are generated individually using the semantic data of the first semantic map. The foreground scene contains foreground components of the first semantic map. The background scene contains background components of the first semantic map. A machine learning model generates an enhanced background view by completing incomplete regions of the background components. Input data is received to modify the background components, the foreground components, or both. A second semantic map is generated in 3D using the enhanced background view, the foreground components, and the input data. The second semantic map is 3D. Virtual camera data is generated using the second semantic map. The virtual camera data includes at least new image data and corresponding new depth data.

20 Claims, 7 Drawing Sheets

(51) Int. Cl.
>  *G06T 11/60* (2006.01)
>  *G06V 10/56* (2022.01)

(52) U.S. Cl.
>  CPC ............... *G06T 2207/20081* (2013.01); *G06T 2207/20084* (2013.01)

(58) Field of Classification Search
>  CPC . G06T 2207/20092; G06T 2207/30244; G06T 2200/08; G06T 2200/24; G06T 2210/62; G06T 2219/2016; G06T 2219/2021; G06T 2219/2004; G06T 7/11; G06T 7/50; G06T 7/73–74; G06T 17/205; G06T 2207/30196; G06T 7/44; G06T 7/80; G06T 2215/12; G06T 2215/16; G06T 11/00; G06T 11/40; G06T 15/10; G06V 20/70; G06V 10/56; G06V 10/70; G06V 10/75; G01C 21/005; G01C 21/20; G01C 21/206; G06N 3/042; G06N 3/045; G06N 3/082; G06N 3/0895; G06N 5/00; G06N 7/001
>  See application file for complete search history.

(56) References Cited

U.S. PATENT DOCUMENTS

| | | | | |
|---|---|---|---|---|
| 2024/0062645 A1* | 2/2024 | Dubinsky | .......... | G08B 13/1436 |
| 2024/0135612 A1* | 4/2024 | Hold-Geoffroy | ......... | G06T 7/50 |
| 2024/0144520 A1* | 5/2024 | Gori | .......... | G06T 7/73 |
| 2024/0144586 A1* | 5/2024 | Hold-Geoffroy | ....... | G06T 15/60 |
| 2024/0144623 A1* | 5/2024 | Gori | .......... | G06T 7/70 |
| 2024/0193727 A1* | 6/2024 | Yu | ............ | G06T 3/18 |
| 2024/0362815 A1* | 10/2024 | Joachim | ................. | G06T 11/00 |
| 2024/0378832 A1* | 11/2024 | Joachim | .................... | G06T 5/50 |
| 2025/0225733 A1* | 7/2025 | Mech | ........................ | G06T 7/70 |

OTHER PUBLICATIONS

Dai et al., "BundleFusion: Real-time Globally Consistent 3D Reconstruction using On-the-fly Surface Re-integration," arXiv:1604. 01093v3 [cs.GR], Feb. 7, 2017, pp. 1-19.

Rukhovich et al., "FCAF3D: Fully Convolutional Anchor-Free 3D Object Detection," European Conference on Computer Vision (ECCV), 2022, pp. 1-17.

Mildenhall et al., "NeRF: Representing Scenes as Neural Radiance Fields for View Synthesis," arXiv:2003.08943v2 [cs.CV], Aug. 3, 2020, pp. 1-25.

Azinovic et al., "Neural RGB-D Surface Reconstruction," Proceedings of the IEEE/CVF Conference on Computer Vision and Pattern Recognition (CVPR), 2002, pp. 1-21.

Muller et al., "AutoRF: Learning 3D Object Radiance Fields from Single View Observations," Proceedings of hte IEEE/CVF Conference on Computer Vision and Pattern Recognition (CVPR), 2022, 10 pages.

* cited by examiner

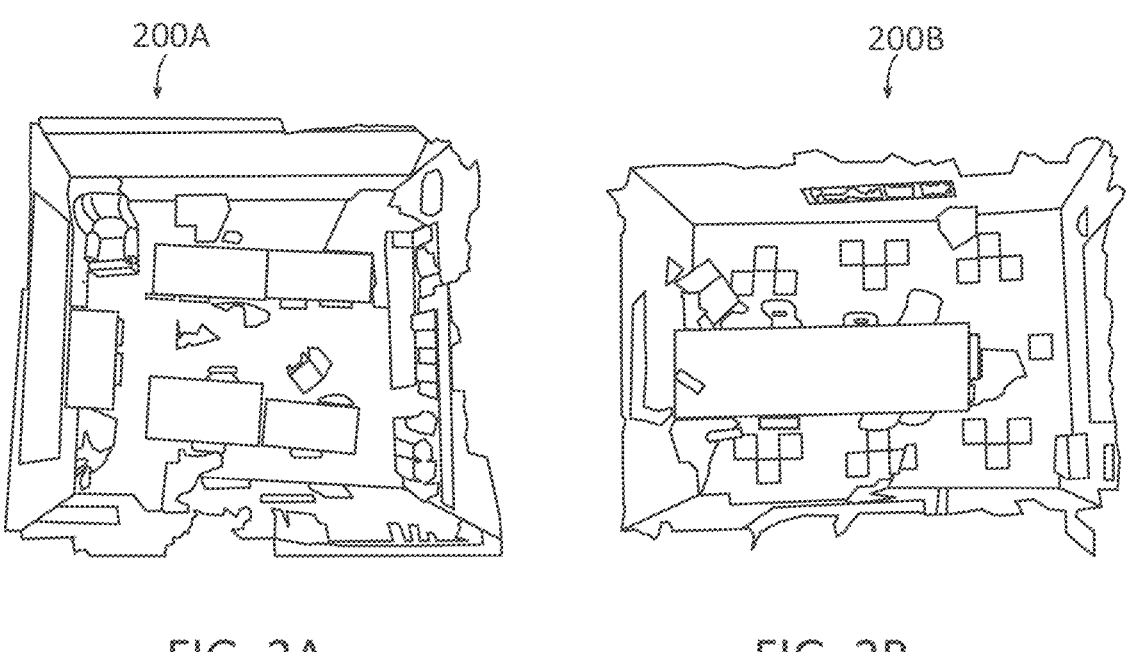
FIG. 2A
FIG. 2B
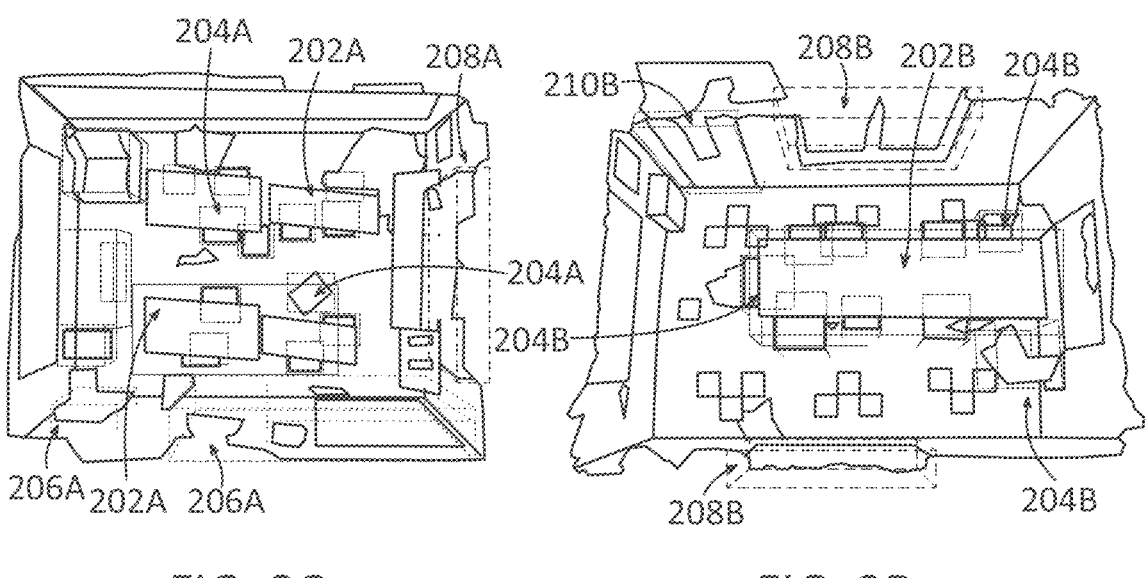
FIG. 2C
FIG. 2D

PROCESSING SYSTEM 708

SENSOR SYSTEM 718

I/O DEVICES 720

OTHER FUNCTIONAL MODULES 722

MEMORY SYSTEM 710

1ST SEMANTIC MAP MODULE 110

EDGE APPLICATION PROGRAM 712

ML SYSTEM 714

OTHER RELEVENT DATA 716

706

704

PROCESSING SYSTEM 724

I/O DEVICES 732

OTHER FUNCTIONAL MODULES 734

MEMORY SYSTEM 726

2ND SEMANTIC MAP MODULE 120

VIRTUAL CAMERA 130

SYSTEM APPLICATION PROGRAM 728

OTHER RELEVENT DATA 730

EDITABLE SEMANTIC MAP WITH VIRTUAL CAMERA FOR MOBILE ROBOT LEARNING

TECHNICAL FIELD

This disclosure relates generally to computer vision, and more particularly to computer vision for mobile robots.

BACKGROUND

Deep neural networks (DNNs) are often used for various tasks relating to computer vision for mobile robots. Such DNNs are improvable via DNN training with large-scale annotated data. However, there still does not appear to be large-scale datasets for training machine learning (ML) systems that are associated with mobile robots for cleaning floors as there aren't many large-scale datasets that are tailored to the peculiar camera viewpoint of these mobile robots that clean floors.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes receiving a first semantic map of an environment. The first semantic map is three-dimensional (3D) and includes semantic data. The method includes generating a background scene by filtering out foreground components from the first semantic map using the semantic data. The background scene includes background components. The method includes generating a foreground scene by filtering out the background components from the first semantic map using the semantic data. The foreground scene includes the foreground components. The method includes generating, via a first machine learning model, an enhanced background view using the background scene. The first machine learning model generates map data for incomplete regions of the background scene. The incomplete regions include at least corresponding parts of the background components occluded by the foreground components in the first semantic map. The map data includes image data and depth data. The method includes receiving input data to edit the background components, the foreground components, or both the background components and the foreground components. The method includes generating a second semantic map using at least the enhanced background view and the input data. The second semantic map is 3D and a modified version of the first semantic map with respect to the background components and the foreground components. The method includes generating virtual camera data using the second semantic map. The virtual camera data includes at least new image data and new depth data of the second semantic map.

According to at least one aspect, a system includes one or more processors and one or more computer memory. The one or more computer memory is in data communication with the one or more processors. The one or more computer memory have computer readable data stored thereon. The computer readable data includes instructions that, when executed by one or more processors, causes the one or more processors to perform a method. The method includes receiving a first semantic map of an environment. The first semantic map is 3D and includes semantic data. The method includes generating a background scene by filtering out foreground components from the first semantic map using the semantic data. The background scene includes background components. The method includes generating a foreground scene by filtering out the background components from the first semantic map using the semantic data. The foreground scene includes the foreground components. The method includes generating, via a first machine learning model, an enhanced background view using the background scene. The first machine learning model generates map data for incomplete regions of the background scene. The incomplete regions include at least corresponding parts of the background components occluded by the foreground components in the first semantic map. The map data includes image data and depth data. The method includes receiving input data to edit the background components, the foreground components, or both the background components and the foreground components. The method includes generating a second semantic map using at least the enhanced background view and the input data. The second semantic map is 3D and a modified version of the first semantic map with respect to the background components and the foreground components. The method includes generating virtual camera data using the second semantic map. The virtual camera data includes at least new image data and new depth data of the second semantic map.

According to at least one aspect, one or more nontransitory computer readable mediums having computer readable data stored thereon. The computer readable data include instructions that, when executed by one or more processors, cause the one or more processors to perform a method. The method includes receiving a first semantic map of an environment. The first semantic map is 3D and includes semantic data. The method includes generating a background scene by filtering out foreground components from the first semantic map using the semantic data. The background scene includes background components. The method includes generating a foreground scene by filtering out the background components from the first semantic map using the semantic data. The foreground scene includes the foreground components. The method includes generating, via a first machine learning model, an enhanced background view using the background scene. The first machine learning model generates map data for incomplete regions of the background scene. The incomplete regions include at least corresponding parts of the background components occluded by the foreground components in the first semantic map. The map data includes image data and depth data. The method includes receiving input data to edit the background components, the foreground components, or both the background components and the foreground components. The method includes generating a second semantic map using at least the enhanced background view and the input data. The second semantic map is 3D and a modified version of the first semantic map with respect to the background components and the foreground components. The method includes generating virtual camera data using the second semantic map. The virtual camera data includes at least new image data and new depth data of the second semantic map.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

BRIEF DESCRIPTION OF THE FIGURES

FIG. 2A is a plan view of a non-limiting example of a dense 3D map according to an example embodiment of this disclosure.

FIG. 2B is a plan view of another non-limiting example of a dense 3D map according to an example embodiment of this disclosure.

FIG. 2C is a plan view of the dense 3D map of FIG. 2A together with an example of object detection according to an example embodiment of this disclosure.

FIG. 2D is a plan view of the dense 3D map of FIG. 2B together with an example of object detection according to an example embodiment of this disclosure.

FIG. 6 is a diagram of non-limiting examples of new 3D object models together with corresponding ground truth data according to an example embodiment of this disclosure.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
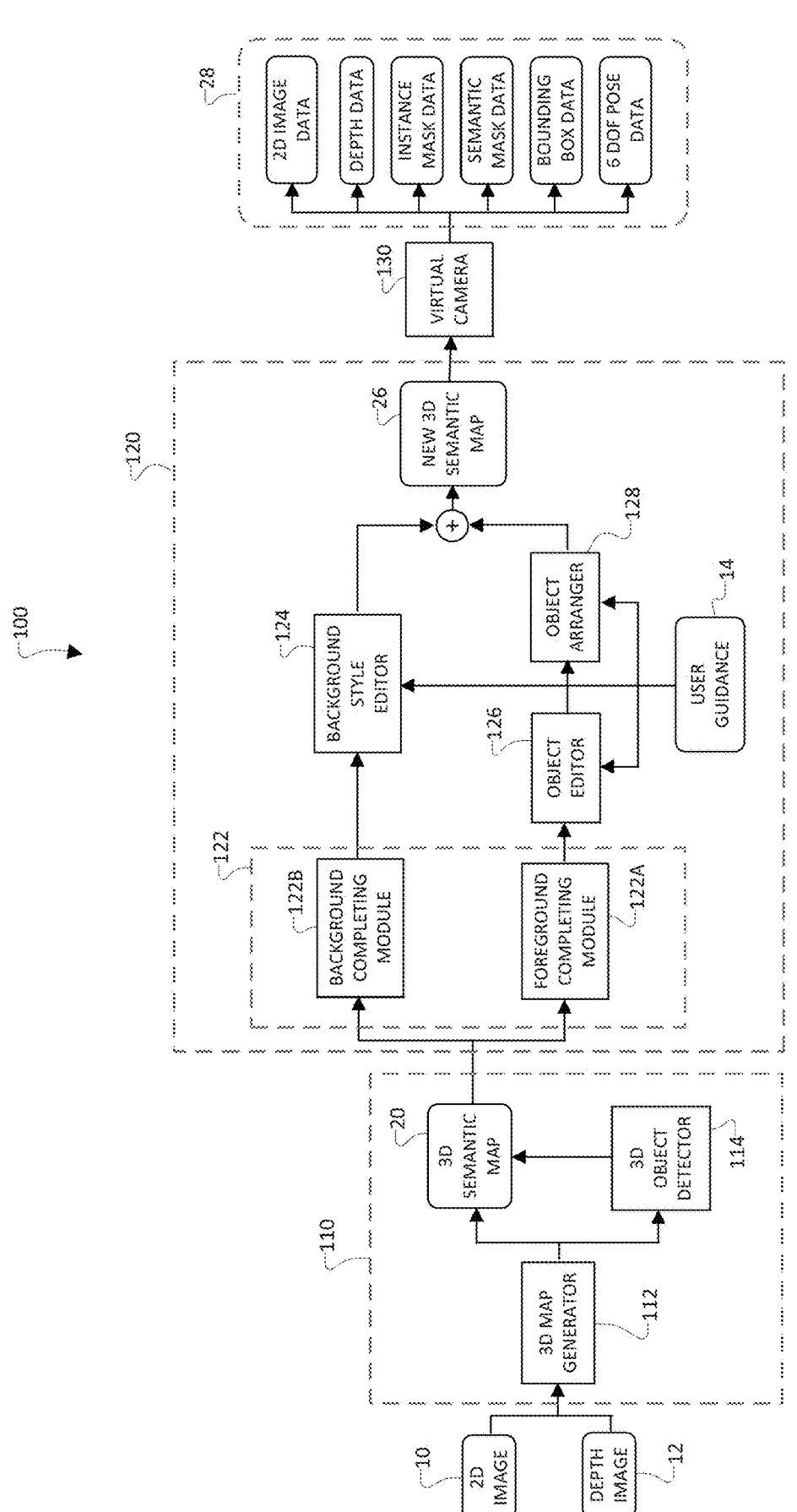
FIG. 1 is a flow diagram of an example of a process of a 3D semantic map network according to an example embodiment of this disclosure.
Figure 7:
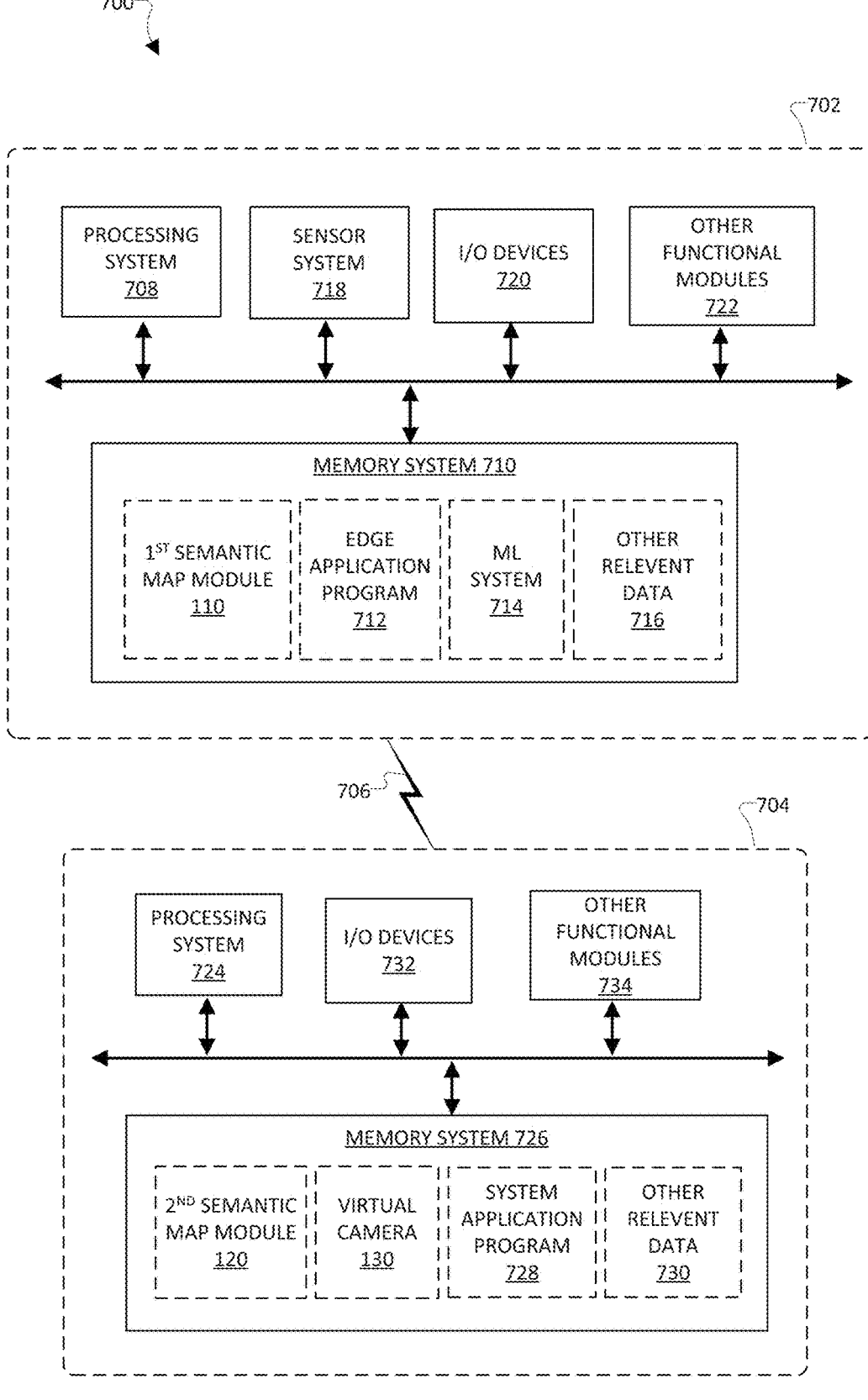
FIG. 7 is a diagram of an example of a system with a semantic map network according to an example embodiment of this disclosure.

FIG. 1 is a flow diagram that illustrates a process relating to a semantic map network 100 for large-scale data generation and machine learning. The process includes generating new annotated training data for training machine learning (ML) systems, such as an ML system 714 (e.g., a DNN, etc.) that may be employed on an edge device 702 (e.g., mobile robots such as robot vacuums). The process is performed by a number of processors of the system 700 (FIG. 7). The system 700 executes a "fast-slow" processing style of 3D neural mapping that may include user input (or at least interaction of at least one human user) in the loop. The semantic map network 100 is configured to use or reuse existing datasets (e.g., public indoor scenes/data) to generate new training data with ground truth data. Additionally or alternatively, the system 700 is configured to generate new training data with ground truth data using sensor data, which includes at least image data (e.g., 2D image 10) and corresponding depth data (e.g., depth image 12). This new annotated training data may be employed with respect to various machine learning-based tasks (e.g., 3D detection, semantic segmentation, decision making, visual severing and control, etc.) of an edge device 702 (e.g., mobile robot such as robot vacuum).

Deriving inspiration from the theory of fast-slow thinking from Daniel Kahneman's book (*Thinking, Fast and Slow*) in which fast-thinking is instinctive and emotional while slow-thinking is deliberative and logical, the semantic map network 100 for 3D neural mapping includes at least a first semantic map module 110 to serve as a "fast-thinking" module, which is employed on an edge device 702, and a second semantic map module 120 to serve as "a slow-thinking" module, which is employed on a computing system 704 (e.g., cloud computing system, remote computing system, another computer system, etc.). The semantic map network 100 also includes a virtual camera 130. The first semantic map module 110, which is executed on an edge device 702 (e.g., robot vacuum), achieves at least real-time dense 3D reconstruction and real-time 3D object detection. The second semantic map module 120, which is employed on a computing system 704, achieves at least 3D scene completing, scene editing, object editing, object arrangement, and new semantic map generation.

The semantic map network 100 includes a mapping method that builds a 3D semantic map 20 of the environment in real-time and generates a new 3D semantic map 26 in which the 3D environment is modified by at least one user via user input data (e.g., image data, audio data, etc.). The new 3D semantic map 26 may be referred to as "3D neural map," due to its generation from neural networks of the second semantic map module 120. In addition, the system 700 is configured to use the new 3D semantic map 26 with a virtual camera 130. More specifically, the system 700 is configured to simulate an appropriate viewpoint (e.g., viewpoint of a robot vacuum) within this new 3D semantic map 26 and generate new training data with ground truth (GT) data at a large-scale.

Referring to FIG. 1, as an example, the semantic map network 100 comprises a 3D neural mapping system, which is configured for large-scale data generation and comprises at least (i) a first semantic map module 110 that is configured to perform scene reconstruction and object detection to generate a 3D semantic map 20, (ii) a second semantic map module 120 that is configured to perform scene completing, object completing, scene editing, object editing, and object arrangement to generate a new 3D semantic map 26, and (iii) a virtual camera 130 that is configured to generate virtual camera data 28 based on the new 3D semantic map 26. The virtual camera data 28 may be used as new training data with annotations. As shown in FIG. 7, the first semantic map module 110 is disposed on at least one edge device 702 while the second semantic map module 120 and the virtual camera 130 are disposed on at least one computing system 704.

The first semantic map module 110 is configured to receive image data (e.g., 2D image 10) and corresponding depth data (e.g., depth image 12). For example, the image data or the 2D image may include red, green, blue (RGB) data. The image data may include any type of digital image in 2D. As a non-limiting example, the image data and the depth data may be obtained as a data stream via a Kinect-like sensor, a public dataset, any applicable data source, or any number and combination thereof. The image data may be obtained from an image sensor (e.g., digital camera) and the corresponding depth data may be obtained from a depth sensor.

The first semantic map module 110 includes a 3D map generator 112, which is configured to perform dense 3D construction or reconstruction using the image data (e.g., 2D image 10) and the corresponding depth data (e.g., depth image 12). The 3D map generator 112 includes a 3D reconstruction model, which receives input data that includes the image data (e.g., 2D image 10) and the depth data (e.g., depth image 12). The 3D reconstruction model is configured to generate an accurate 3D map of the environment using the image data (e.g., 2D image 10) and the corresponding depth data (e.g., depth image 12). In addition, the 3D map generator 112 employs a simultaneous localization and mapping (SLAM) process to generate a dense 3D map using the RGB and depth streams. As a non-limiting example, the RGB-depth (RGB-D) SLAM process may include at least BundleFusion, which is a real-time, end-to-end framework for 3D scanning of large-scale scenes using RGB-D input. Also, due to the missing scans and limitation of a commodity depth sensor, there may be depth values, which are missing such that there appears to be "holes" in the dense 3D map. In this regard, the 3D map generator 112 may include a neural RGB-D surface reconstruction method to generate depth values that are missing in the dense 3D map due to missing scans and/or limitations of the depth sensor.

In addition, the first semantic map module 110 includes a 3D object detector 114, which is configured receive at least one 3D map as input. For example, in FIG. 1, the 3D object detector 114 is configured to receive the 3D map from the 3D map generator 112. The 3D map may be a dense 3D map. Upon receiving at least one 3D map as input, the 3D object detector 114 is configured to generate a 3D bounding box for each detected object and estimate the pose data (e.g., 6 Degrees-of-Freedom (DoF) pose data) of each detected object. The 3D object detector 114 employs an anchor-free 3D detection method to detect each 3D object bounding box and estimate each 6 DoF object pose using the 3D map. For instance, as a non-limiting example, the 3D object detector 114 includes a 3D object detection network comprising at least Fully Convolutional Anchor-Free 3D Object Detection (FCAF3D) as the anchor-free 3D detection method. After performing 3D object detection on at least one 3D map, the first semantic map module 110 is configured to generate and output a 3D semantic map 20 of the environment. The 3D semantic map 20 comprises a 3D model of the environment along with semantic data that identifies each element/object in the 3D semantic map 20.

FIG. 2A and FIG. 2B illustrate non-limiting examples of dense 3D maps, which are generated by the 3D map generator 112. More specifically, FIG. 2A shows a dense 3D map 200A of a room with a floor and four walls. In addition, FIG. 2A also shows two large desks, two medium desks, a table, chairs, bookcases, and a window. Meanwhile, FIG. 2B shows a dense 3D map 200B of another room having a tile patterned floor and four walls. In addition, FIG. 2B also shows a long table, a number of chairs, a white board on a shorter dimensioned wall, a door defined on a first longer dimensioned wall, and a first set of windows on the first longer dimensioned wall, and a second set of windows on the second longer dimensioned wall. As shown in FIG. 2A and FIG. 2B, the first semantic map module 110 includes a 3D map generator 112, which is configured to generate dense 3D maps of the environment.

FIG. 2C and FIG. 2D illustrate non-limiting examples of object detection, via the object detector 114. In these examples, the object detection is performed with respect to the dense 3D map 200A of FIG. 2A and the dense 3D map 200B of FIG. 2B, respectively. In this case, the object detections are represented by colored bounding boxes in which a detected object is within a bounded box and a particular color of that bounding box refers to a particular object class. For example, in FIG. 2C, the dense 3D map includes yellow bounding boxes for tables/desks (e.g., yellow bounding boxes 202A for the two large desks, yellow bounding boxes 202A for the two medium desks, a yellow bounding box 202A for the table), blue bounding boxes 204A for chairs, green bounding boxes 206A for the bookcases, and teal colored bounding boxes 208A for the window. As another example, in FIG. 2D, the dense 3D map includes a yellow bounding box 202B for the long table, blue bounding boxes 204B for the chairs, a purple bounding box 210B for the door, and teal bounding boxes 208B for the first set of windows, and teal bounding boxes 208B for the second set of windows. As shown in FIG. 2C and FIG. 2D, there are some overlap between the yellow bounding boxes 202A/202B for the tables and the blue bounding boxes 204A/204B for the chairs.

As discussed above, to guarantee the real-time performance of the first semantic map module 110 on an edge device 702, the semantic map network 100 uses (i) the RGB-D SLAM method to construct the environment (e.g., room reconstruction) and (ii) the anchor-free 3D detection method for object detection of one or more objects in the environment. Both of these methods are employed by the edge device 702 (e.g., mobile robot) in real-time. The first semantic map module 110 of the edge device 702 is configured to transmit the dense 3D semantic map 20 to the second semantic map module 120 of the computing system 704.

Referring to FIG. 1, the second semantic map module 120 of the computing system 704 is configured to receive the dense 3D semantic map 20 from the first semantic map module 110 of the edge device 702. Although the first semantic map module 110 may employ a neural RGB-D surface reconstruction method to complete some depth values missing in the dense 3D map, there may be some additional depth values that are missing due to object occlusions. As a non-limiting example, the 3D semantic map 20 may include a contact area between a sofa and a floor, which is missing and not completed by the neural RGB-D surface reconstruction method of the edge device 702. Fortunately, the second semantic map module 120 includes the novel dual-branch scene completing method to complete the depth values and RGB values of object occlusion areas.

Figure 3:
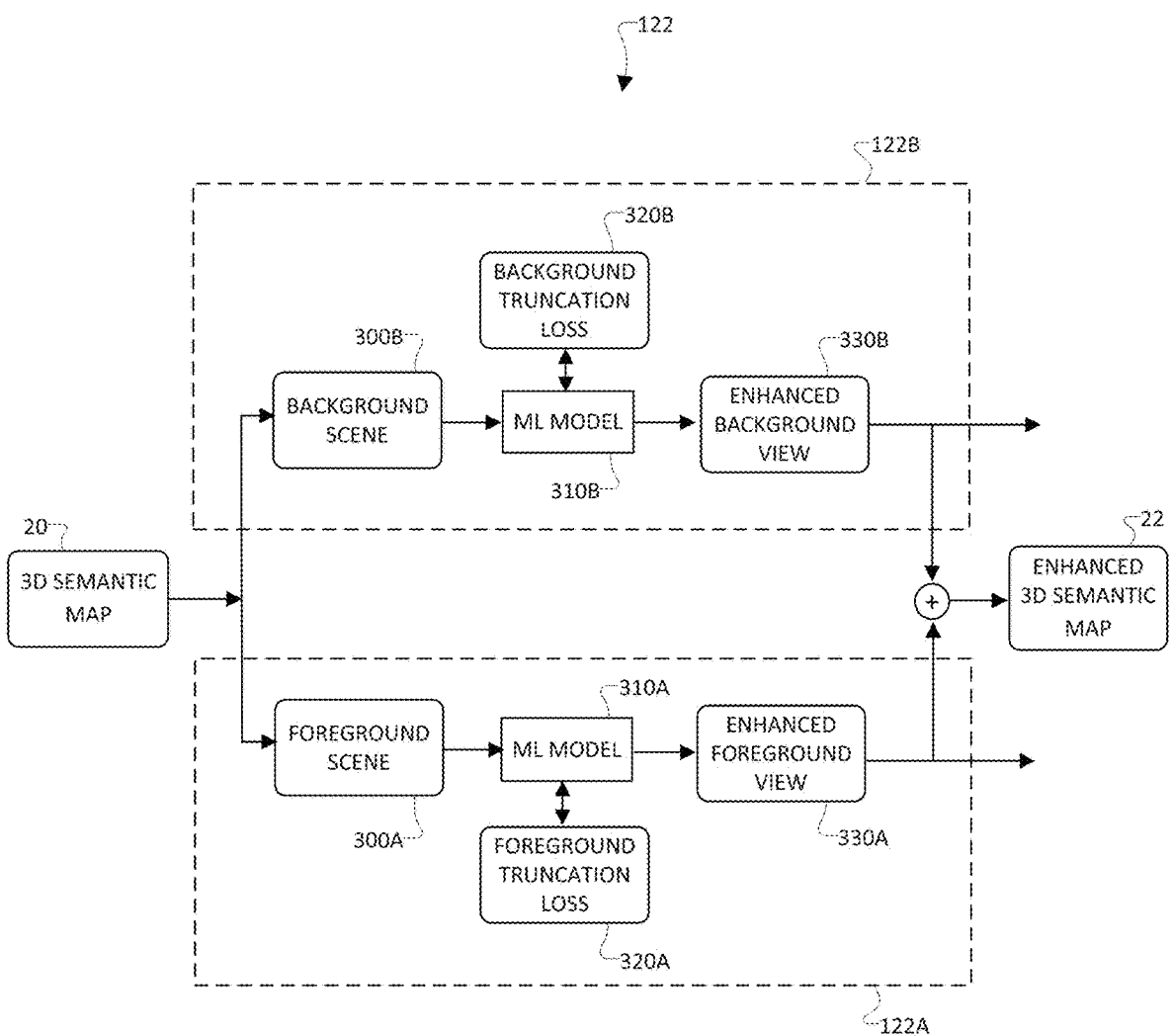
FIG. 3 is a flow diagram of an example of a process relating to scene completion according to an example embodiment of this disclosure.

As shown in FIG. 1 and FIG. 3, the second semantic map module 120 includes a novel dual-branch scene completing method, which is configured to complete the foreground scene and the background scene, separately. The second semantic map module 120 is configured to process the 3D semantic map 20 and use the semantic information of the detected objects to separate the foreground scene 300A and the background scene 300B from each other. In this regard, as shown in FIG. 3, the second semantic map module 120 is configured to disentangle the 3D semantic map 20 into (i) at least one background scene 300B and (ii) at least one foreground scene 300A. As a non-limiting example, then second semantic map module 120 is configured to generate a background scene 300B from the 3D semantic map 20 in which the background scene 300B includes only background components (e.g., a floor, walls, and a ceiling), whereby the foreground components (e.g., objects such as the furniture) have been filtered out of the 3D semantic map 20. As a non-limiting example, the second semantic map module 120 is configured to generate a foreground scene 300A from the 3D semantic map 20 in which the foreground scene 300A includes only the foreground components (e.g., furniture such as a chair, a table, a sofa, etc.), whereby the background components (e.g., floor, walls, ceiling, etc.) have been filtered out of the 3D semantic map 20.

FIG. 3 shows an example of a process of the scene completing module 122. In this example, the scene completing module 122 includes a foreground completing module 122A and a background completing module 122B. As shown in FIG. 1 and FIG. 3, the scene completing module 122 includes disentangling the dense 3D semantic map 20 into a foreground scene 300A and a background scene 300B, respectively. The foreground completing module 122A and the background completing module 122B are configured to operate simultaneously or at different times.

The foreground completing module 122A is configured to generate the foreground scene 300A, for example, by filtering out the background components of the 3D semantic map 20 using the semantic data such that the foreground scene 300A includes only the foreground components. In this example, the semantic data includes object detection semantic masks of the 3D semantic map 20. In this regard, the foreground scene 300A does not include the background components of the 3D semantic map 20. As a non-limiting example, when the 3D semantic map 20 includes a room with furniture, then the foreground scene 300A includes the foreground objects, such as the furniture (e.g., chair, table, sofa, bed, etc.), of the 3D semantic map 20 and does not include the background components (e.g., floor, walls, ceiling, etc.) of the 3D semantic map 20.

Also, as shown in FIG. 3, the foreground completing module 122A includes at least one ML model 310A, which is configured to receive the foreground scene 300A and generate the enhanced foreground view 330A. The enhanced foreground view 330A is a completed version or a substantially completed version of the foreground scene 300A. The enhanced foreground view 330A may be referred to as the "completed foreground view" as there are no missing map data in this view of the foreground components. The enhanced background view 330B is an augmented version of the background scene 300B. In this example, the ML model 310A comprises Neural Radiance Fields (NeRF) model to generate the enhanced foreground view 330A using the foreground scene 300A. This NeRF model may be referred to as "object NeRF" as this model completes the missing map data (e.g., pixel values and/or depth values) of the foreground objects, the foreground components, and/or the foreground scene.

In addition, the background completing module 122B is configured to generate the background scene 300B, for example, by filtering out the foreground components of the 3D semantic map 20 using the semantic data such that the background scene 300B includes only the background components of the 3D semantic map 20. In this example, the semantic data includes object detection semantic masks of the 3D semantic map 20. In this regard, the background scene 300B does not include the foreground components of the 3D semantic map 20. As a non-limiting example, when the 3D semantic map 20 includes a room with furniture, then the background scene 300B includes the background components, such as the structural elements (e.g., the floor, the walls, etc.) that define the room, and does not include the foreground components (e.g., furniture) of the 3D semantic map 20.

As shown in FIG. 3, the background completing module 122B includes at least one ML model 310B, which is configured to receive the background scene 300B and generate the enhanced background view 330B. The enhanced background view 330B is a completed version or a substantially completed version of the background scene 300B. The enhanced background view 330B may be referred to as the "completed background view" as there are no missing map data in this view of the background components. The enhanced background view 330B is an augmented version of the background scene 300B. In this example, the ML model 310B comprises a NeRF model to generate the enhanced background view 330B using the background scene 300B. This NeRF model may be referred to as "background NeRF" as this model completes 3D map data (e.g., pixel values and/or depth values) of the background components and/or the background scene.

As discussed above, the scene completing module 122 comprises a dual-branch configuration with (i) an ML model 310A (e.g., the object NeRF) that completes each object of the foreground scene 300A and generates an enhanced foreground view 330A and (ii) an ML model 310B (e.g., the background NeRF) that completes the background scene 300B and generates an enhanced background view 330B. Also, the scene completing module 122 includes a foreground truncation loss 320A and a background truncation loss 320B. The foreground truncation loss 320A is used to update parameters of the ML model 310A (e.g., the object NeRF) so that the ML model 310A is enabled to model each 3D shape more accurately. The background truncation loss 320B is used to update parameters of the ML model 310B (e.g., background NeRF) so that the ML model 310B is enabled to model each 3D shape more accurately. The foreground truncation loss 320A and the background truncation loss 320B mitigate the mutual effect between generating the enhanced background view 330B by completing the background scene 300B and generating the enhanced foreground view 330A by competing the foreground scene 300A.

Also, as shown in FIG. 3, the scene completing module 122 is configured to combine the enhanced foreground view 330A and the enhanced background view 330B. The scene completing module 122 is thus configured to bring the results of the dual branches together. The scene completing module 122 is configured to generate an enhanced 3D semantic map 22, which combines the enhanced foreground view 330A and the enhanced background view 330B. The scene completing module 122 is advantageous in completing the background scene 300B without the foreground components to be able to discover and complete map data/values (e.g., depth values and RGB values) that are missing, for example, due to object occlusions at least in part by foreground components. Similarly, the scene completing module 122 is advantageous in completing the foreground scene 300A without the background components to be able to discover and complete map data/values (e.g., depth values and RGB values) that are missing, for example, due to object occlusions at least in part by background components. The missing map values become apparent when the foreground/ background components are filtered out. In this regard, in contrast to other surface reconstruction methods, the scene completing module 122 completes not only the depth values of missing sensor scans and sensor noises, but also the depth values of object occlusions. With this scene completing module 122, there are no missing depth values and no missing RGB values in the enhanced 3D semantic map 22 and the new 3D semantic map 26. Also, the enhanced background view 330B does not suffer from missing map values even after at least one user modifies (e.g., removes, edits, etc.) and/or rearranges the foreground components (e.g., furniture) in a room because the scene completing module 122 completes all missing map data due to object occlusions (e.g., the contact area between the sofa and floor), missing sensor scans, sensor noises, etc. prior to such modification and/or rearrangement of the foreground components.

Figures 4A, 4B:
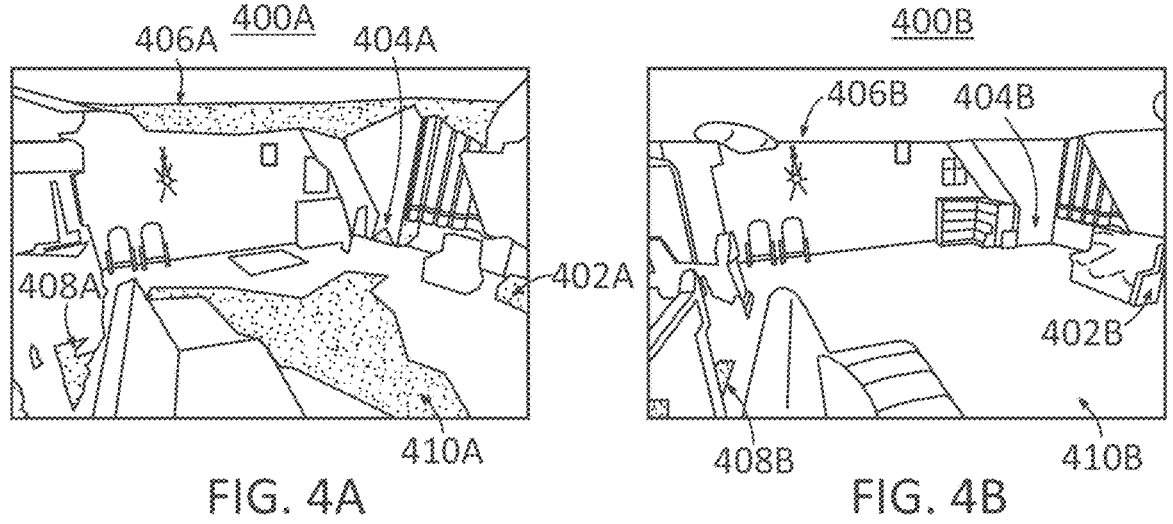
FIG. 4A is a visualization of a non-limiting example of a view of an enhanced 3D semantic map according to an example embodiment of this disclosure.
FIG. 4B is a visualization of FIG. 4A after a scene completion process according to an example embodiment of this disclosure.

FIG. 4A is a visualization 400A of a non-limiting example of a view of a 3D semantic map 20. As shown in FIG. 4A, the visualization 400A shows map data, which are missing from the 3D semantic map 20 generated from the first semantic map module 110. The map data may refer to pixel values (e.g., RGB values), depth values, or both pixel values and depth values. In FIG. 4A, the missing map data are highlighted with the same purple color. More specifically, in FIG. 4A, the 3D semantic map 20 includes missing map data at a number of regions, which include at least (i) an incomplete portion 402A of the floor under the television, (ii) an incomplete portion 404A of the floor near one of the walls, (iii) an incomplete portion 406A of an upper part of a wall, (iv) an incomplete portion 408A of the floor that is located behind the sofa, and (v) an incomplete portion 410A of the floor that is located in front of the sofa. As shown in the visualization 400A, the first semantic map module 110 may create a 3D semantic map 20 that includes a number of missing values or incomplete regions of map data due to object occlusions, missing depth scans, etc.

FIG. 4B is a visualization 400B of the enhanced 3D semantic map 22 of FIG. 4A after the scene completing module 122 has processed the 3D semantic map 20 according to an example embodiment. As shown in FIG. 4B, the visualization 400B shows that the missing map data of FIG. 4A has been completed via the scene completing module 122. As aforementioned, the map data may refer to pixel values (e.g., RGB values), depth values, or both pixel values and depth values. In FIG. 4A, the missing map data are highlighted with the same purple color in the visualization 400A. In contrast, in FIG. 4B, there are no missing map data or substantially no missing map data in the visualization 400B. More specifically, for example, the enhanced 3D semantic map 22 includes scene completion of map data at a number of regions, which include at least (i) a completed portion 402B of the floor under the television, (ii) a completed portion 404B of the floor near one of the walls, (iii) a completed portion 406B of an upper part of a wall, (iv) a completed portion 408B of the floor that is located behind the sofa, and (v) a completed portion 410B of the floor that is located in front of the sofa. As shown in the visualization 400B, the scene completing module 122 is configured to (i) fill in missing values or incomplete regions of map data of the 3D semantic map 20 that may have occurred due to object occlusions, missing depth scans, etc., and (ii) generate an enhanced 3D semantic map 22 based on an enhanced background view 330B and an enhanced foreground view 330A.

Figure 4C:
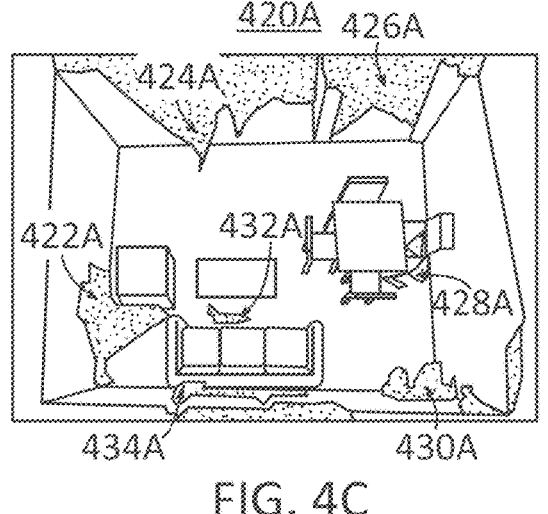
FIG. 4C is a visualization of another non-limiting example of a view of an enhanced 3D semantic map according to an example embodiment of this disclosure.

FIG. 4C is a visualization 420A of a view of a non-limiting example of another 3D semantic map 20. As shown in FIG. 4C, the visualization 420A shows map data, which are missing from the 3D semantic map 20 generated from the first semantic map module 110. The map data may refer to pixel values (e.g., RGB values), depth values, or both pixel values and depth values. In FIG. 4C, the missing map data are highlighted with the same purple color. More specifically, in FIG. 4C, the 3D semantic map 20 is missing some map data at a number of regions, which include at least (i) an incomplete portion 422A of the wall and the floor on a left side of the sofa, (ii) an incomplete portion 424A of the wall and floor across from the sofa, (iii) an incomplete portion 426A of the floor under the door frame, (iv) an incomplete portion 428A of the floor that is located under the table and chairs, (v) an incomplete portion 430A of the floor and wall that is located on a right side of the sofa and behind the table and chairs, (vi) an incomplete portion 432A of the floor between the coffee table and the sofa, and (vii) an incomplete portion 434A of the backrest of the sofa. As shown in the visualization 420A, the first semantic map module 110 may create a 3D semantic map 20 that includes a number of missing values or incomplete regions of map data due to object occlusions, missing depth scans, etc.

Figure 4D:
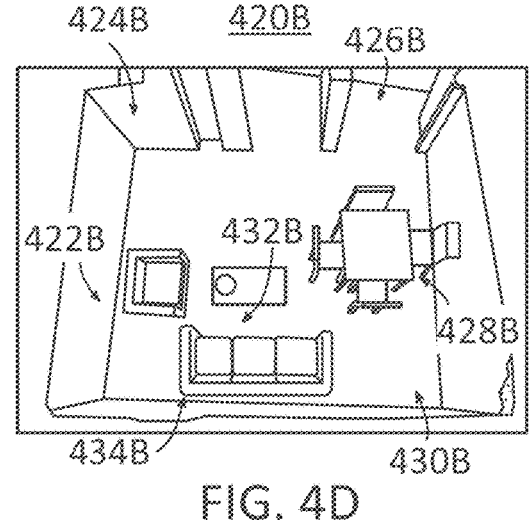
FIG. 4D is a visualization of FIG. 4C after a scene completion process according to an example embodiment of this disclosure.

FIG. 4D is a visualization 420B of the enhanced 3D semantic map 22 of FIG. 4C after the scene completing module 122 has processed the 3D semantic map 20 according to an example embodiment. As shown in FIG. 4D, the visualization 420B shows that the missing map data of FIG. 4C has been completed via the scene completing module 122. As aforementioned, the map data may refer to pixel data (e.g., RGB data), depth data, or both pixel data and depth data. In FIG. 4D, the missing map data are highlighted with the same purple color in the visualization 420A. In contrast, in FIG. 4D, there are no missing map data or substantially no missing map data in the visualization 420B. More specifically, for example, the enhanced 3D semantic map 22 includes scene completion of map data at a number of regions, which include at least (i) a completed portion 422B of the wall and the floor on a left side of the sofa, (ii) a completed portion 424B of the wall and floor across from the sofa, (iii) a completed portion 426B of the floor under the door frame, (iv) a completed portion 428B of the floor that is located under the table and chairs, (v) a completed portion 430B of the floor and wall that is located on a right side of the sofa and behind the table and chairs, (vi) a completed portion 432B of the floor between the coffee table and the sofa, and (vii) a completed portion 434B of backrest of the sofa. As shown in the visualization 420B, the foreground completing module 122A is configured to (i) fill in missing values or incomplete regions of map data of the 3D semantic map 20 that may have occurred due to object occlusions, missing depth scans, etc., and (ii) generate an enhanced 3D semantic map 22 based on an enhanced background view 330B and an enhanced foreground view 330A.

After the scene completing module 122, the semantic map network 100 includes an editing process of the enhanced foreground view 330A and/or the enhanced background view 330B. The semantic map network 100 is configured to include user guidance 14 during the editing process. More specifically, in the example shown in FIG. 1, the second semantic map module 120 is configured to receive input data from at least one user with respect to performing one or more editing operations. In this regard, the semantic map network 100 includes user interface with a neural interface. The user interface enables a user to perform editing with ease via at least one simple command. The command may relate to image data (e.g., a 2D digital image), audio data (e.g., a voiced description), etc. In this regard, the user interface is configured to receive input data, such as an image (e.g., image on the internet), audio data (e.g., voice sentence), or text data. The neural interface is configured to receive this input data and guide the decoration style and appearance of the background scene and/or the foreground scene. The input data is further regarded as a condition for the NeRF-based neural rendering and editing.

Referring to FIG. 1, upon completing the background scene, the second semantic map module 120 includes a background style editor 124, which is configured to perform style editing using the enhanced background view 330B. As shown in FIG. 1, background style editor 124 is configured to receive at least (i) the enhanced background view 330B and (ii) input data that provides user guidance 14 for style editing. The computing system 704 is configured to modify the enhanced background view 330B from a current style to a new style based on the input data. The current style refers to a present appearance (e.g., color, texture, etc.) of the environment that is also conveyed and captured via the 3D semantic map. The new style refers to a particular appearance (e.g., color, texture, etc.) that is specified via the input data. As a non-limiting example, given a room, the style may include a decoration style such as traditional Chinese style, Minimalist Nordic style, or another distinct style. In this regard, for instance, the background style editor 124 is configured to modify a color, a style, or a material of one or more background components. As a non-limiting example, the background style editor 124 may change a color of the walls from white to red. The background style editor 124 may change a style (e.g., texture, material, etc.) of the floor from carpet to hardwood.

Referring to FIG. 1, upon completing the foreground scene, the second semantic map module 120 includes an object editor 126, which is configured to perform one or more editing operations on a number of detected objects of the enhanced foreground view 330A. For example, the object editor 126 is configured to generate a modified version of each foreground component (e.g., an object such as furniture) in which the modified version of the foreground component is modified with respect to shape, color, style, or any combination thereof. In this example, the object editor 126 is configured to perform an editing operation on a foreground object via a cross-category object NeRF representation. More specifically, the object editor 126 is configured to generate a number of different objects that belong to the same category (e.g., category of chairs), and not just one specific individual object for a particular category. In this regard, the object editor 126 is configured to change the appearance and the shape, and thus may generate various objects in the same category that differ in terms of appearance and/or shape. For instance, as a non-limiting example, the object editor 126 is configured to process and generate various types of cars (e.g., a sport utility vehicle (SUV), a sedan, a truck, etc.). The system 700 is configured to edit the style of the enhanced background view 330B via the object editor 126 that involves a cross-category background NeRF representation.

Figure 5:
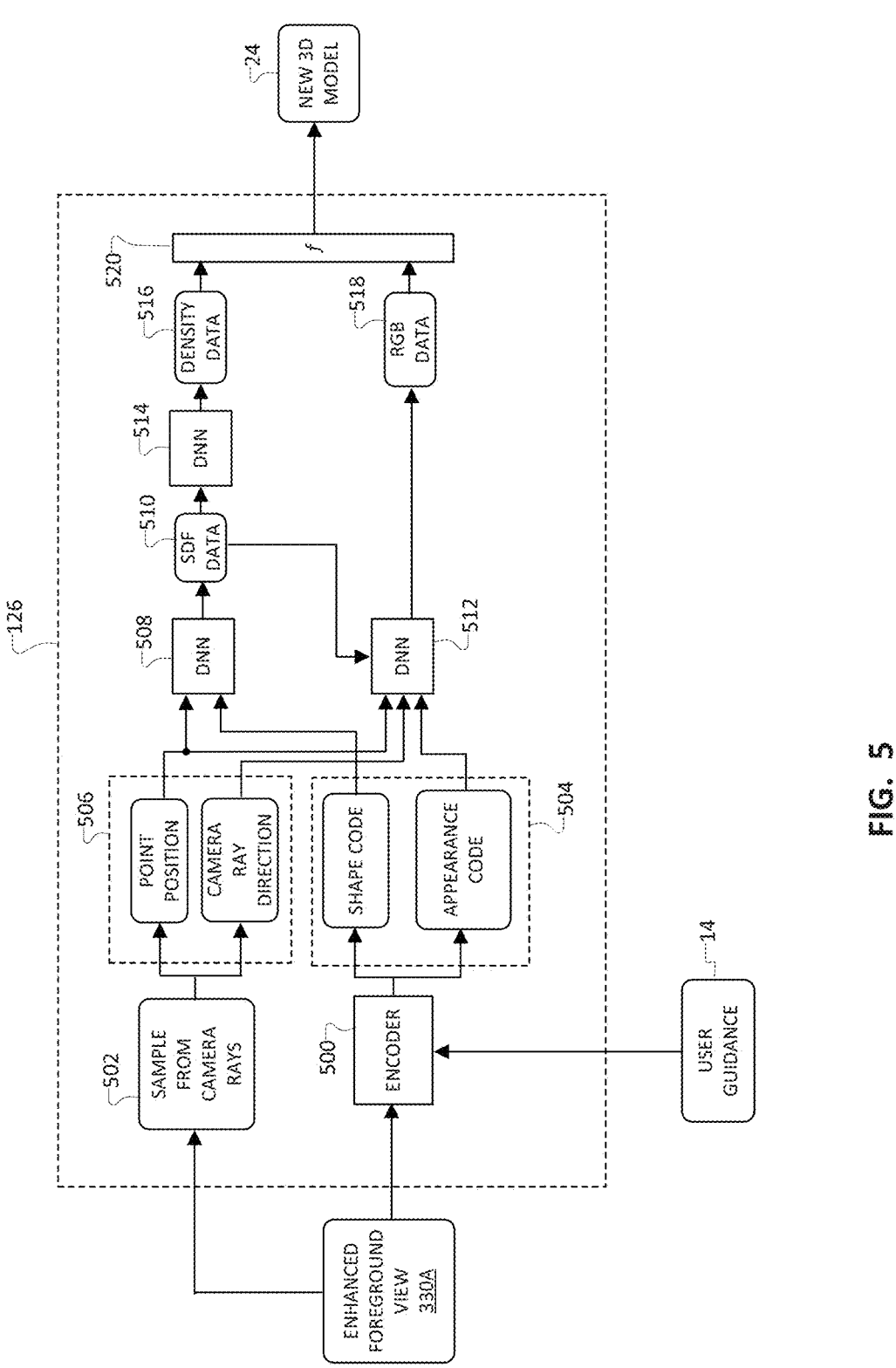
FIG. 5 is a flow diagram of an example of a process relating to object editing and object rearrangement according to an example embodiment of this disclosure.

FIG. 5 is a flow diagram that illustrates an example of a process of the object editor 126. In this example, the object editor 126 is configured to receive input data that includes image data (e.g., digital image) or text data. This input data may be obtained with user guidance 14 and/or received as input data via interaction involving at least one user. The object editor 126 includes an encoder 500 (e.g., DNN) to encode the input data (e.g., image data, text data, etc.) into high-dimensional feature embedding data or latent embedding data. The input data (e.g., image data and/or text data) may be generated from sensor data from one or more sensors. For example, the text data may be generated from an audio sensor that captures audio data (e.g., a voice sentence) from a user. As a non-limiting example, the object editor 126 may receive input data that includes at least (i) a text description such as "a red Chinese style chair," or (ii) a digital image of a red Chinese style chair.

The encoder 500 includes an image encoder, a text encoder, or both an image encoder and a text encoder. The latent embeddings 504 include shape embedding data and appearance embedding data in an object-specific way. In addition, the object editor 126 is configured to generate camera ray data 506 associated with pixels of the enhanced foreground view 330A. In FIG. 5, for example, the object editor 126 is configured to generate one or more sample sets of camera rays 502 of 3D points in the 3D space associated with the enhanced foreground view 330A. Also, the object editor 126 is configured to generate camera ray data 506 using one or more sample sets of camera rays 502. The camera ray data 506 includes at least point position data and ray direction data.

The object editor 126 represents and edits foreground objects (e.g., furniture) by disentangling the latent embeddings 504. More specifically, the object editor 126 includes a machine learning system with machine learning models. For example, in FIG. 5, the machine learning system includes at least DNN 508, DNN 512, and DNN 514. As shown in FIG. 5, in contrast to the typical NeRF method itself, the object editor 126 includes and employs at least one DNN 508 to generate or predict Signed Distance Field (SDF) data 510 using the shape embedding data and the point position data. Next, the SDF data 510 is transmitted to DNN 512 and DNN 514. Upon receiving the SDF data 510, the DNN 514 is configured to generate density data 516 using the SDF data 510. Depth data may be calculated from the density data 516.

Also, as shown in FIG. 5, the DNN 512 is configured to generate 2D image data (e.g., RGB data 518) using the camera ray data 506 (e.g., point position data and ray direction data), the appearance embedding data, and the SDF data 510. In addition, the object editor 126 includes a function (f) 520, which is employed to generate the new 3D model 24 of each object based on the 2D image data (e.g., RGB data 518) and the density data 516. The function (f) 520 is a volume rendering function that generates 3D object models. The object editor 126 is configured to generate a more accurate and sharper object shape by performing surface reconstruction via the predicted SDF data 510 instead of directly regressing the density as in the NeRF method itself.

Figure 6:
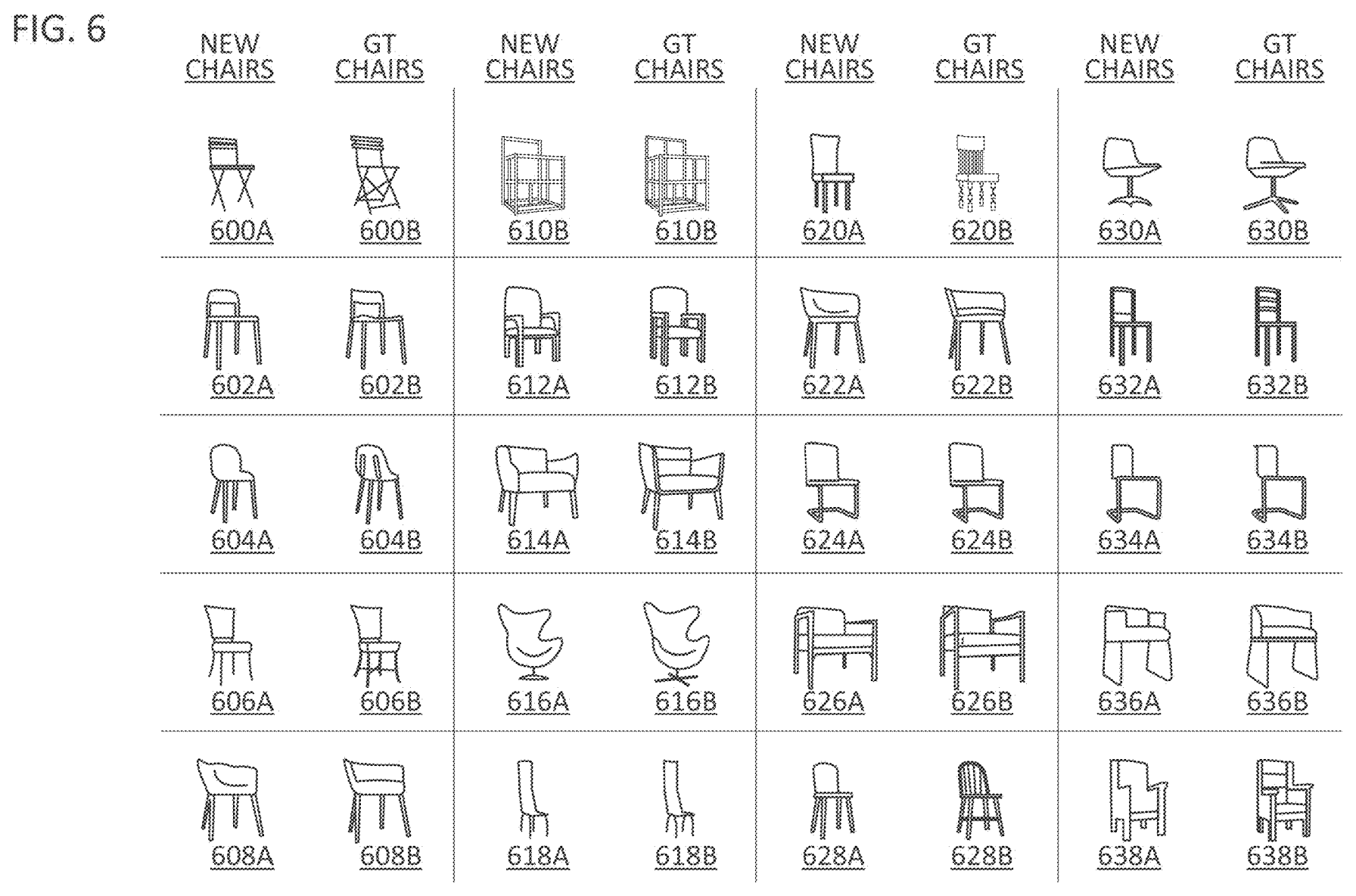

FIG. 6 illustrates the generated new chairs by the cross-one-category NeRF of FIG. 5. For example, cross-one category may refer to a chair category that includes various types of chairs, as shown in FIG. 6, that differ with respect to at least appearance (e.g., color, material, texture, etc.), shape, or a combination of appearance and shape. In FIG. 6, the odd columns refer to the generated new 3D models of the chairs and the even columns refer to the corresponding ground truth (GT) 3D model of those same chairs. More specifically, with respect to the first column and the second column, FIG. 6 shows (i) new chair 600A and its corresponding GT chair 600B in the first row, (ii) new chair 602A and its corresponding GT chair 602B in the second row, (iii) new chair 604A and its corresponding GT chair 604B in the third row, (iv) new chair 606A and its corresponding GT chair 606B in the fourth row, and (v) new chair 608A and its corresponding GT chair 608B in the fifth row. With respect to the third column and the fourth column, FIG. 6 shows (i) new chair 610A and its corresponding GT chair 610B in the first row, (ii) new chair 612A and its corresponding GT chair 612B in the second row, (iii) new chair 614A and its corresponding GT chair 614B in the third row, (iv) new chair 616A and its corresponding GT chair 616B in the fourth row, (v) new chair 618A and its corresponding GT chair 618B in the fifth row. With respect to the fifth column and the sixth column, FIG. 6 shows (i) new chair 620A and its corresponding GT chair 620B in the first row, (ii) new chair 622A and its corresponding GT chair 622B in the second row, (iii) new chair 624A and its corresponding GT chair 624B in the third row, (iv) new chair 626A and its corresponding GT chair 626B in the fourth row, and (v) new chair 628A and its corresponding GT chair 628B in the fifth row. With respect to the seventh column and the eighth column, FIG. 6 shows (i) new chair 630A and its corresponding GT chair 630B in the first row, (ii) new chair 632A and its corresponding GT chair 632B in the second row, (iii) new chair 634A and its corresponding GT chair 634B in the third row, (iv) new chair 636A and its corresponding GT chair 636B in the fourth row, (v) new chair 638A and its corresponding GT chair 638B in the fifth row. As evidenced by FIG. 6, the object editor 126 is configured to generate various types of new chairs for the "chair category" that differ with respect to appearance and shape based on user guidance 14. Also, the semantic map network 100 generates new chair models that are substantially similar to the GT chairs. In this regard, the semantic map network 100 is configured to generate a new 3D model 24 of a particular foreground component (e.g., chair) that is substantially similar to GT 3D model of that foreground object.

Referring to FIG. 1, the object editor 126 is configured to provide its result (e.g., edited/modified object or new 3D model 24) to an object arranger 128. The object arranger 128 is configured to receive user guidance 14 and place each newly generated foreground component (e.g., new 3D model 24 such as a chair) into the enhanced background view 330B or a new version (e.g., new/edited style) of the enhanced background view 330B. The object arranger 128 is configured to position each foreground component (e.g., new 3D model 24 or a completed foreground object) into a vacant/unoccupied space (or a free and available space) of the applicable background scene (e.g., enhanced background view 330B or a newly styled version of the enhanced background view 330B). The object arranger 128 is configured to receive input data from at least one user regarding the placement of each foreground component (e.g., object such as a chair) with respect to the applicable background scene (e.g., enhanced background view 330B or a newly styled version of the enhanced background view 330B). The object arranger 128 may place the newly generated foreground component (e.g., the new 3D model 24) in the original position or may place the newly generated foreground component at a different position. Also, the user may include input data that indicates a removal or deletion of one or more foreground components or edited/new foreground components with respect to the applicable background scene. In other words, the object arranger 128 is configured to enable a version (e.g., enhanced, edited, or new version) of the foreground component to be (i) arranged in the new 3D semantic map 26 at a location that corresponds an original position and/or pose of the 3D semantic map 20, (ii) arranged in the new 3D semantic map 26 at a location that corresponds to a different position and/or pose from the 3D semantic map 20, or (iii) not arranged in the new 3D semantic map 26 by deleting this foreground component. In addition, as shown in FIG. 1, the second semantic map module 120 generates a new 3D semantic map 26 by combining the result of the background editing process and the result of the foreground editing process.

As discussed above, upon receiving the 3D semantic map 20 from an edge device 702, the semantic map network 100 includes completing missing map data of the background scene 300B and completing missing map data of the foreground scene 300A. The semantic map network 100 also includes receiving user guidance 14 with respect to editing the enhanced background view 330B, the enhanced foreground view 330A, or both the enhanced background view 330B and the enhanced foreground view 330A. For example, the semantic map network 100 may include receiving, via the user interface, a digital image of a country-style room as input data and then the semantic map network 100 may include generating a new country-style background scene (e.g., white shiplap walls and dark hardwood floors) with the same structural layout of the room as the enhanced background view 330B but with a modified appearance (e.g., color, texture, material, etc.) of the background components. In addition, the semantic map network 100 may include generating a new/edited foreground scene in which a number of original foreground components (e.g., modern style furniture that includes a rectangular table with six dining chairs) have been edited to new/edited foreground components (e.g., rustic-style furniture that includes a round table with four dining chairs) based on an image or text description associated with country-style furniture. Next, the semantic map network 100 is configured to output a new 3D semantic map 26 that combines (i) the new background scene that is generated based on the enhanced background view 330B in which a number of background components are edited according to the input data (e.g., user guidance 14) and (ii) new foreground scene that is generated based on the enhanced foreground view 330A in which the foreground components (e.g., furniture) are edited and arranged according to the input data (e.g., user guidance 14).

In addition, as shown in FIG. 1, the semantic map network 100 includes at least one virtual camera 130. More specifically, as a non-limiting example, after generating the new 3D semantic map 26 with the new decoration style room and new edited furniture, the semantic map network 100 includes using at least one virtual camera 130 with respect to the new 3D semantic map 26 to capture virtual camera data 28. For example, the semantic map network 100 may involve placing at least one virtual camera 130 in the new 3D semantic map 26 to generate virtual camera data 28 for an edge device 702. In this example, the virtual camera 130 is located close to the floor region of the new 3D semantic map 26 to simulate the viewpoint of an edge device 702 (e.g., floor cleaning robot such as a robot vacuum). The newly generated data may be referred to as "virtual camera data 28." The virtual camera data 28 is associated with ground truth (GT) data and includes RGB image, depth image, semantic mask, instance mask, 3D bounding box, 6 DoF pose, etc. The semantic map network 100 is configured to generate unlimited large-scale annotated data for training the ML system 714 (e.g., DNN) of the mobile robot to improve tasks (e.g., 3D object detection, semantic segmentation, instance segmentation, decision making, visual severing and control, etc.) of the mobile robot.

Each virtual camera 130 employs a virtual camera sampling method, which simulates a viewpoint of the edge device 702. For example, the virtual camera 130 is configured to simulate a viewpoint at a low height that is close to the floor when capturing virtual camera data 28 for an edge device 702 that is a mobile robot for cleaning floors, vacuuming, etc. The virtual camera 130 uses the new 3D semantic map 26 to capture virtual camera data 28 that includes realistic sensor data with annotations. For example, as shown in FIG. 1, the virtual camera data 28 may comprise annotated data that includes 2D image data (e.g., RGB image, etc.), depth data, instance mask data, semantic mask data, 3D bounding box data, 6 DoF pose data, etc. The virtual camera 130 may be involved and/or employed to generate large-scale annotated training data for training one or more machine learning systems (e.g., ML system 714 of FIG. 7) to perform one or more tasks of the edge device 702 (e.g., autonomous driving of the robot vacuum).

FIG. 7 is a diagram of an example of a system 700, which is configured to perform the process of the semantic map network 100 (FIG. 1). The system 700 is configured to perform large-scale data generation for training and/or improving machine learning models (e.g., DNNs). For example, the system 700 includes at least one edge device 702 and at least one computing system 704 (e.g. cloud computing system, remote computing system, etc.), which are communicatively connected to each other via the communication technology 706. Each edge device 702 performs data processing functions at the "edge" of a network. In this regard, each edge device 702 is a functional, technical device, which is also configured to act as an entry point to at least the network. Each edge device 702 is configured to interface with one or more users and/or the real-world environment. As non-limiting examples, for instance, an edge device 702 may include a mobile robot (e.g., robot vacuum, etc.), a smart watch, an Internet of Things (IoT) device, or any similar edge technology.

Each edge device 702 includes at least a processing system 708 with at least one processing device. For example, the processing system 708 may include an electronic processor, a central processing unit (CPU), a graphics processing unit (GPU), a tensor processing unit (TPU), a microprocessor, a field-programmable gate array (FPGA), an application-specific integrated circuit (ASIC), processing technology, or any number and combination thereof. The processing system 708 is operable to provide the functionalities as disclosed herein.

The edge device 702 includes a memory system 710, which is operatively connected to the processing system 708. In this regard, the processing system 708 is in data communication with the memory system 710. In an example embodiment, the memory system 710 includes at least one non-transitory computer readable storage medium, which is configured to store and provide access to various data to enable at least the processing system 708 to perform the operations and functionalities, as disclosed herein. In an example embodiment, the memory system 710 comprises a single memory device or a plurality of memory devices. The memory system 710 may include electrical, electronic, magnetic, optical, semiconductor, electromagnetic, or any suitable storage technology that is operable with the edge device 702. For instance, in an example embodiment, the memory system 710 may include random access memory (RAM), read only memory (ROM), flash memory, a disk drive, a memory card, an optical storage device, a magnetic storage device, a memory module, any suitable type of memory device, or any number and combination thereof. The memory system 710 includes at least the first semantic map module 110, an edge application program 712, at least one ML system 714, and other relevant data 716, which are stored thereon and which include each computer readable data with instructions, which, when executed by the processing system 708, is configured to perform the functions as disclosed herein. The computer readable data may include instructions, code, routines, various related data, any software technology, or any number and combination thereof. The first semantic map module 110 is configured to generate the 3D semantic map 20 based on the 2D image 10 and the depth image 12. Also, the first semantic map module 110 is configured to perform the functions described in relation to FIG. 1. The edge application program 712 is configured to perform a number of functions for the edge device 702. For example, the edge application program 712 is configured to manage machine learning inferences and/or control the edge device 702 based on machine learning inferences of the ML system 714. The ML system 714 includes at least one machine learning system (e.g., artificial neural network, DNN, etc.), which is configured to perform a task (e.g., classification, object detection, etc.) of the edge device 702. In this regard, for example, the ML system 714 is configured to generate local prediction data based on input data (e.g., sensor data from sensor system 718). Meanwhile, the other relevant data 716 provides various computer readable data and/or software technology (e.g. operating system, etc.), which enables the system 700 to perform the functions as discussed herein.

The edge device 702 is configured to include at least one sensor system 718. The sensor system 718 includes one or more sensors. For example, the sensor system 718 includes at least an image sensor and a depth sensor. The sensor system 718 may also include one or more other sensors (e.g., a camera, a radar sensor, a light detection and ranging (LIDAR) sensor, a thermal sensor, an ultrasonic sensor, an infrared sensor, a motion sensor, an audio sensor, etc.). The sensor system 718 is operable to communicate with one or more other components (e.g., processing system 708 and memory system 710) of the edge device 702. For example, the sensor system 718 may provide sensor data, which is then used by the processing system 708 to generate digital image data based on the sensor data. In this regard, the processing system 708 is configured to obtain the sensor data as digital image data directly or indirectly from one or more sensors of the sensor system 718. The sensor system 718 is local, remote, or a combination thereof (e.g., partly local and partly remote). Upon receiving the sensor data, the processing system 708 is configured to process this sensor data (e.g. image data) in connection with the first semantic map module 110, the edge application program 712, the ML system 714, the other relevant data 716, or any number and combination thereof.

In addition, the edge device 702 may include at least one other component. For example, as shown in FIG. 2, the memory system 710 is also configured to store other relevant data 716, which relates to operation of the edge device 702 in relation to one or more components (e.g., at least one sensor system 718, at least one I/O devices 720, and other functional modules 722). In addition, the edge device 702 includes one or more I/O devices 720 (e.g., display device, microphone, speaker, etc.). Also, the edge device 702 includes other functional modules 722, such as any appropriate hardware, software, or combination thereof that assist with or contribute to the functioning of the edge device 702. For example, the other functional modules 722 include communication technology (e.g. wired communication technology, wireless communication technology, or a combination thereof) that enables components of the edge device 702 to communicate with each other as described herein. Also, the other functional modules 722 may include one or more other systems. As a non-limiting example, for instance, when the edge device 702 is a mobile robot (e.g., robot vacuum), then the other functional modules 722 include an actuation system with one or more actuators relating to driving, steering, stopping, and/or controlling a movement of the mobile robot.

The edge device 702 is operably connected to and in data communication with the computing system 704 via communication technology 706. The computing system 704 is a cloud computing system, a remote computing system, another computer system, or the like. The computing system 704 includes at least one processing system 724 with at least one processing device. For example, the processing system 724 may include an electronic processor, a CPU, a GPU, a TPU, a microprocessor, a FPGA, an ASIC, any processing technology, or any number and combination thereof. The processing system 724 is operable to provide the functionalities as described herein.

The computing system 704 includes a memory system 726, which is operatively connected to the processing system. In this regard, the processing system 724 is in data communication with the memory system 726. In an example embodiment, the memory system 726 includes at least one non-transitory computer readable storage medium, which is configured to store and provide access to various data to enable at least the processing system 724 to perform the operations and functionality, as disclosed herein. The memory system 726 comprises a single memory device or a plurality of memory devices. The memory system 726 may include electrical, electronic, magnetic, optical, semiconductor, electromagnetic, or any suitable storage technology that is operable with the computing system 704. For instance, in an example embodiment, the memory system 726 may include random access memory (RAM), read only memory (ROM), GPU High Bandwidth Memory (HBM), flash memory, a disk drive, a memory card, an optical storage device, a magnetic storage device, a memory module, memory technology, or any number and combination thereof.

The memory system 726 includes at least the second semantic map module 120, the virtual camera 130, a system application program 728, and other relevant data 730, which are stored thereon and which each include computer readable data with instructions, which, when executed by the processing system 724, is configured to perform the functions as disclosed herein. The computer readable data may include instructions, code, routines, various related data, any software technology, or any number and combination thereof. The second semantic map module 120 is configured to generate the new 3D semantic map 26 based on the 3D semantic map 20 and user guidance 14. Also, the second semantic map module 120 is configured to perform the functions described herein. The virtual camera 130 is configured to generate virtual camera data 28 based on the new 3D semantic map 26. Also, the virtual camera 130 is configured to perform the functions described herein. The system application program 728 is configured to operate and control the computing system 704. Meanwhile, the other relevant data 730 provides various computer readable data and/or software technology (e.g. operating system, etc.), which enables the computing system 704 to perform the functions as discussed herein.

In addition, the computing system 704 may include at least one other component. For example, as shown in FIG. 7, the memory system 726 is also configured to store other relevant data 730, which relates to operation of the computing system 704 in relation to one or more components thereof and/or edge devices 702 of the network. In addition, the computing system 704 is configured to include one or more I/O devices 732 (e.g., display device, keyboard device, speaker device, etc.), which relate to the computing system 704. The I/O devices 732 are configured to receive input data for user guidance 14. Also, the computing system 704 includes other functional modules 734, such as any appropriate hardware, software, or combination thereof that assist with or contribute to the functioning of the computing system 704. For example, the other functional modules 734 include communication technology (e.g., wired communication technology, wireless communication technology, or a combination thereof) that enables components of the computing system 704 to communicate with each other and/or each edge device 702 as described herein.

As described above, the embodiments include a number of advantages and benefits. For example, the semantic map network 100 is configured to generate annotated training data for various machine learning tasks of mobile robots (e.g., robot vacuum, floor cleaning robots, etc.) at a large-scale. The semantic map network 100 benefits from being a fast-slow-thinking style of 3D neural mapping with at least one human user in the loop. The semantic map network 100 includes 3D reconstruction, object detection, scene completion, editing, object arrangement, and virtual camera capturing. The semantic map network 100 is configured to generate new realistic training data with ground truth with respect to a particular viewpoint at a large-scale based on an existing public dataset and/or sensor data captured data one or more sensors. The semantic map network 100 may be used for data generation tasks and/or other data augmentation tasks for training DNNs to improve the data-driven DNN performance.

In addition, the semantic map network 100 includes a novel dual-branch scene completing method with a foreground truncation loss and a background truncation loss. The semantic map network 100 is configured to complete the foreground and background separately without mutual effect. The semantic map network 100 is advantageous in being configured to complete the missing map data (e.g., RGB values and/or depth values) of object occlusions (e.g., the contact area between the sofa and floor) in 3D semantic maps 20. In addition, the semantic map network 100 includes a novel cross-category object NeRF-based reconstruction method. The semantic map network 100 is configured to disentangle the latent embeddings of (e.g., shape and appearance), while also being configured to infer the map data (e.g., the density values and/or RGB values) from the learned SDF data.

As discussed above, the semantic map network 100 includes a fast-slow process of 3D neural mapping that leverages the learning ability of DNN from large-scale data. This 3D neural mapping is configured to perform at least 3D reconstruction, semantic detection, scene completing, and scene/object modification (e.g., editing and rearrangement), as well as the generation of large-scale annotated training data at a predetermined viewpoint (e.g., view of edge device 702). The semantic map network 100 is advantageous in enabling users to perceive an environment, perceive what they are unable to see, and perceive what is not available to see.

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method comprising:
receiving a first semantic map of an environment, the first semantic map being three-dimensional (3D) and including semantic data;
generating a background scene by filtering out foreground components from the first semantic map using the semantic data, the background scene including background components;
generating a foreground scene by filtering out the background components from the first semantic map using the semantic data, the foreground scene including the foreground components;
generating, via a first machine learning model, an enhanced background view using the background scene, the first machine learning model generating map data for incomplete regions of the background scene, the incomplete regions including at least corresponding parts of the background components occluded by the foreground components in the first semantic map, the map data including image data and depth data;
receiving input data to edit the background components, the foreground components, or both the background components and the foreground components;
generating a second semantic map using at least the enhanced background view and the input data, the second semantic map being 3D and a modified version of the first semantic map with respect to the background components and the foreground components; and
generating virtual camera data using the second semantic map, the virtual camera data including at least new image data and new depth data of the second semantic map.

2. The computer-implemented method of claim 1, further comprising:
generating, via a second machine learning model, the map data for the incomplete regions of the foreground scene, the incomplete regions corresponding to each occluded part of each foreground component.

3. The computer-implemented method of claim 2, further comprising:
updating first parameters of the first machine learning model using a first truncation loss associated with completing the background scene; and
updating second parameters of the second machine learning model using a second truncation loss associated with completing the foreground scene, wherein,
the first machine learning model includes a first Neural Radiance Fields (NeRF) model, and
the second machine learning model includes a second NeRF model.

4. The computer-implemented method of claim 1, wherein the input data includes at least (i) image data with a particular style or (ii) text data that specifies the particular style.

5. The computer-implemented method of claim 1, wherein:
the virtual camera data is captured from a viewpoint of a mobile robot; and
the virtual camera data further includes instance mask data, semantic mask data, bounding box data, and pose data.

6. The computer-implemented method of claim 5, further comprising:
generating annotated training data using the virtual camera data; and
training a deep neural network (DNN) using the annotated training data,
wherein the DNN is employed by the mobile robot.

7. The computer-implemented method of claim 1, further comprising:
generating, via another machine learning system, a new foreground component using a particular foreground component and the input data,
wherein,
the new foreground component is modified with respect to a selected feature based on the input data, and
the selected feature is color, shape, style, position, or pose.

8. The computer-implemented method of claim 7, wherein the another machine learning system includes (i) a first deep neural network (DNN) to predict a signed distance field (SDF) data from a subset of latent embeddings of features of the particular foreground component, (i) a second DNN to predict density data using the SDF data and (iii) a third DNN to predict 2D image data using the SDF data.

9. A system comprising:
one or more processors;
one or more computer memory in data communication with the one or more processors, wherein the one or more computer memory being non-transitory and having computer readable data stored thereon, the computer readable data including instructions that, when executed by one or more processors, causes the one or more processors to perform a method, the method including
receiving a first semantic map of an environment, the first semantic map being three-dimensional (3D) and including semantic data;
generating a background scene by filtering out foreground components from the first semantic map using the semantic data, the background scene including background components;
generating a foreground scene by filtering out the background components from the first semantic map using the semantic data, the foreground scene including the foreground components;
generating, via a first machine learning model, an enhanced background view using the background scene, the first machine learning model generating map data for incomplete regions of the background scene, the incomplete regions including at least corresponding parts of the background components occluded by the foreground components in the first semantic map, the map data including image data and depth data;

receiving input data to edit the background components, the foreground components, or both the background components and the foreground components;

generating a second semantic map using at least the enhanced background view and the input data, the second semantic map being 3D and a modified version of the first semantic map with respect to the background components and the foreground components; and generating virtual camera data using the second semantic map, the virtual camera data including at least new image data and new depth data of the second semantic map.

10. The system of claim 9, further comprising:
generating, via a second machine learning model, the map data for the incomplete regions of the foreground scene, the incomplete regions corresponding to each occluded part of each foreground component.

11. The system of claim 10, further comprising:
updating first parameters of the first machine learning model using a first truncation loss associated with completing the background scene; and
updating second parameters of the second machine learning model using a second truncation loss associated with completing the foreground scene,
wherein,
the first machine learning model includes a first Neural Radiance Fields (NeRF) model, and
the second machine learning model includes a second NeRF model.

12. The system of claim 9, wherein:
the virtual camera data is captured from a viewpoint of an mobile robot; and
the virtual camera data further includes instance mask data, semantic mask data, bounding box data, and pose data.

13. The system of claim 12, further comprising:
generating annotated training data using the virtual camera data; and
training a deep neural network (DNN) using the annotated training data,
wherein the DNN is employed by the mobile robot.

14. The system of claim 9, further comprising:
generating, via another machine learning system, a new foreground component using a particular foreground component and the input data,
wherein,
the new foreground component is modified with respect to a selected feature based on the input data; and
the selected feature is color, shape, style, position, or pose.

15. The system of claim 14, wherein the another machine learning system includes (i) a first deep neural network (DNN) to predict a signed distance field (SDF) data from a subset of latent embeddings of features of the particular foreground component, (i) a second DNN to predict density data using the SDF data and (iii) a third DNN to predict 2D image data using the SDF data.

16. One or more non-transitory computer readable mediums having computer readable data stored thereon, the computer readable data including instructions that, when executed by one or more processors, cause the one or more processors to perform a method, the method comprising:

receiving a first semantic map of an environment, the first semantic map being three-dimensional (3D) and including semantic data;

generating a background scene by filtering out foreground components from the first semantic map using the semantic data, the background scene including background components;

generating a foreground scene by filtering out the background components from the first semantic map using the semantic data, the foreground scene including the foreground components;

generating, via a first machine learning model, an enhanced background view using the background scene, the first machine learning model generating map data for incomplete regions of the background scene, the incomplete regions including at least corresponding parts of the background components occluded by the foreground components in the first semantic map, the map data including image data and depth data;

receiving input data to edit the background components, the foreground components, or both the background components and the foreground components;

generating a second semantic map using at least the enhanced background view and the input data, the second semantic map being 3D and a modified version of the first semantic map with respect to the background components and the foreground components; and generating virtual camera data using the second semantic map, the virtual camera data including at least new image data and new depth data of the second semantic map.

17. The one or more non-transitory computer readable mediums of claim 16, further comprising:
generating, via a second machine learning model, the map data for the incomplete regions of the foreground scene, the incomplete regions corresponding to each occluded part of each foreground component.

18. The one or more non-transitory computer readable mediums of claim 17, further comprising:
updating first parameters of the first machine learning model using a first truncation loss associated with completing the background scene; and
updating second parameters of the second machine learning model using a second truncation loss associated with completing the foreground scene,
wherein,
the first machine learning model includes a first Neural Radiance Fields (NeRF) model, and
the second machine learning model includes a second NeRF model.

19. The one or more non-transitory computer readable mediums of claim 16, further comprising:
generating, via another machine learning system, a new foreground component using a particular foreground component and the input data,
wherein,
the new foreground component is modified with respect to a selected feature based on the input data; and
the selected feature is color, shape, style, position, or pose.

20. The one or more non-transitory computer readable mediums of claim 19, wherein the another machine learning system includes (i) a first deep neural network (DNN) to predict a signed distance field (SDF) data from a subset of latent embeddings of features of the particular foreground component, (i) a second DNN to predict density data using the SDF data and (iii) a third DNN to predict 2D image data using the SDF data.

* * * * *